FIG. 2.

Inventor
Oliver H. Gish,
By [signature]
Attorney

July 7, 1931.    O. H. GISH    1,813,845
APPARATUS FOR THE STUDY OF THE EARTH'S CRUST
Filed April 19, 1929    5 Sheets-Sheet 5

Inventor
Oliver H. Gish,
By [signature]
Attorney

Patented July 7, 1931

1,813,845

UNITED STATES PATENT OFFICE

OLIVER H. GISH, OF SOMERSET, CHEVY CHASE, MARYLAND, ASSIGNOR TO CARNEGIE INSTITUTION OF WASHINGTON, OF WASHINGTON, DISTRICT OF COLUMBIA, A CORPORATION

APPARATUS FOR THE STUDY OF THE EARTH'S CRUST

Application filed April 19, 1929. Serial No. 356,333.

This invention relates to the study of the earth's crust and more particularly to a method and apparatus for taking electrical readings involving the electric current and potential as it passes through a given section of the earth's crust. It contemplates the measurement of resistivity of large masses of undisturbed earth with a view of exploring into the earth's crust, and thus assist in ascertaining geological structure and in locating ores, minerals, etc.

It has for its object the development of an electrical method for measuring the resistivity by passing an electric current through the earth and at the same time taking measurements of the strength thereof and of the difference in potential between selected points with the end in view of calculating the resistivity by means of a known equation. It further contemplates the making of a number of such readings for the purpose of basing an opinion of the constituency and geological structure of the earth's crust.

A further object of the invention is the production of an instrument for carrying out these readings in an accurate and efficient manner. A further object of the invention is the provision in such an instrument of a means for the prevention of current leakage from one portion to another. A still further object of the invention is the production of a commutator, which will enable the observer to automatically reverse the direction of the current sent through the earth without producing a change in the direction of deflection of pointers of reading instruments, and which will furthermore, automatically bring the concommitant electrical measurements into such a time-relation one to the other that erroneous results, which may arise from certain electrical transients, may be avoided.

Other objects and advantages of the invention will hereinafter appear in the following description and the novel features thereof will be particularly pointed out in the appended claims.

Like reference numerals indicate like parts throughout the several figures of the drawings in which.

Figure 1:
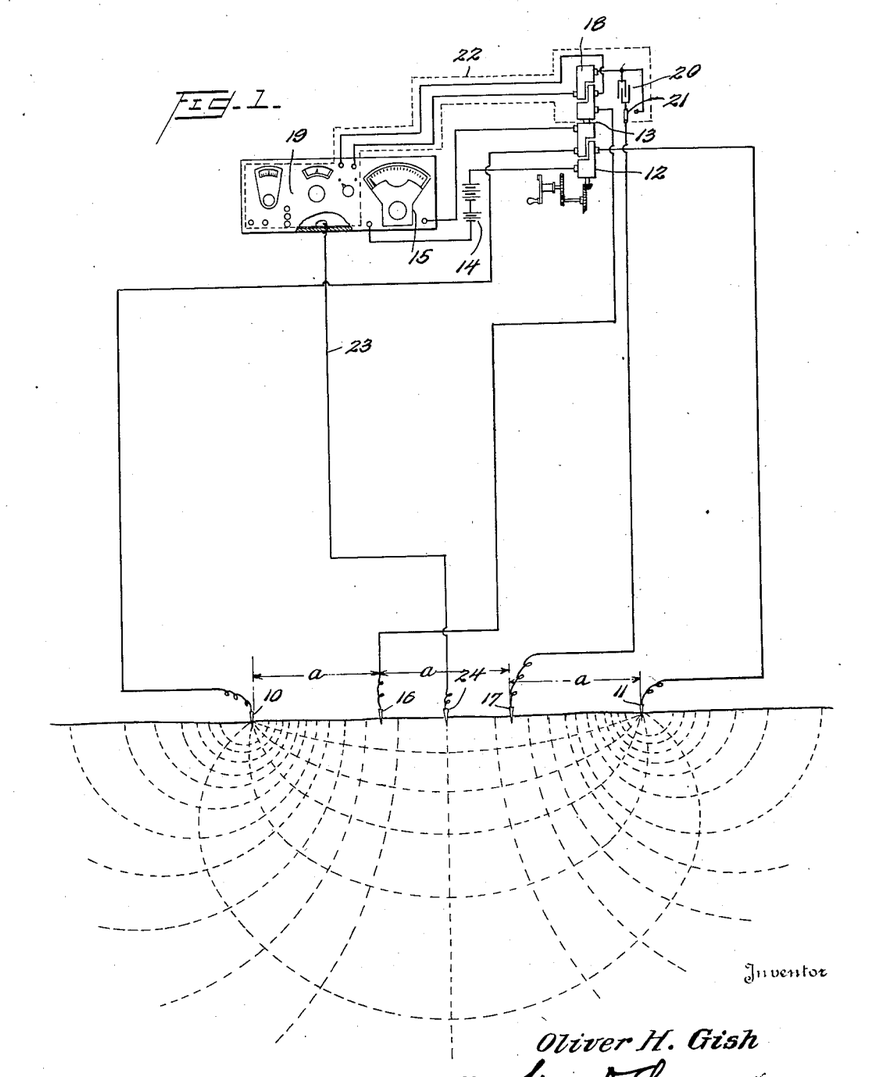
Figure 1 is a diagrammatic view of the apparatus and electrical circuits for carrying out the method and on this view is also shown in the conventional manner the approximate course of the electric current through the earth.

Referring to Figure 1, 10 and 11 are electrodes inserted in the ground at successive intervals, the extremes of which are determined by the depth of crust to be explored and other requirements of the electrical survey. These electrodes are connected by well insulated cables to brushes on one element 12 of a double commutator designated by the numeral 13. Current is supplied from a battery 14 and its strength is measured on a multiple range milliammeter 15. It will be appreciated that the battery will supply current to the commutator member 12 for passage through earth between the electrodes 10 and 11.

Other electrodes 16 and 17 are inserted in the earth at points generally intermediate between the electrodes 10 and 11 and usually in a straight line therewith in such manner that the distance between the electrodes 16 and 17 will be the same as that between 16 and 10, as also that between 17 and 11. This disposal of electrodes has been found in general to be the most convenient, but it may be varied if desired for special purposes. These electrodes 16 and 17 are connected to brushes on the second commutator section 18 and from this commutator section the electric circuit is completed through the potentiometer where the potential between these points may be read. A condenser 20 may be introduced in series with the circuit comprising the electrodes 16 and 17, when found desirable, by means of a switch 21.

In view of the much higher potential in the circuit comprising the electrodes 10 and 11 relative to that comprising the electrodes 16 and 17, leakage of small currents between these circuits are likely to occur, and in order to overcome defect arising from this source it has been found desirable to intercept all of the paths between these two circuits by a conductor, which is in turn connected to a neutral point on the earth's crust. This has been indicated in the drawings by the dotted line designated by the numeral 22. The conductor casing is grounded by the wire 23 passing through the electrode 24, and while this electrode 24 may be placed in any relatively neutral point, it has been shown for the purpose of illustration midway between the electrodes 16 and 17.

While the combining of the instruments herein set forth is novel and the process of taking readings in the manner outlined is new, several of the instruments themselves are well known commercially. There is one of these instruments, however, which has had to be especially designed and constructed to accomplish the purposes of the invention. It is the commutator 13, and in this specification will be set forth a detail description of that element. The peculiarity of construction of this commutator has been the salient factor in permitting the association of the elements just described in the production of an apparatus for carrying out the process set forth in this application.

Figure 2:
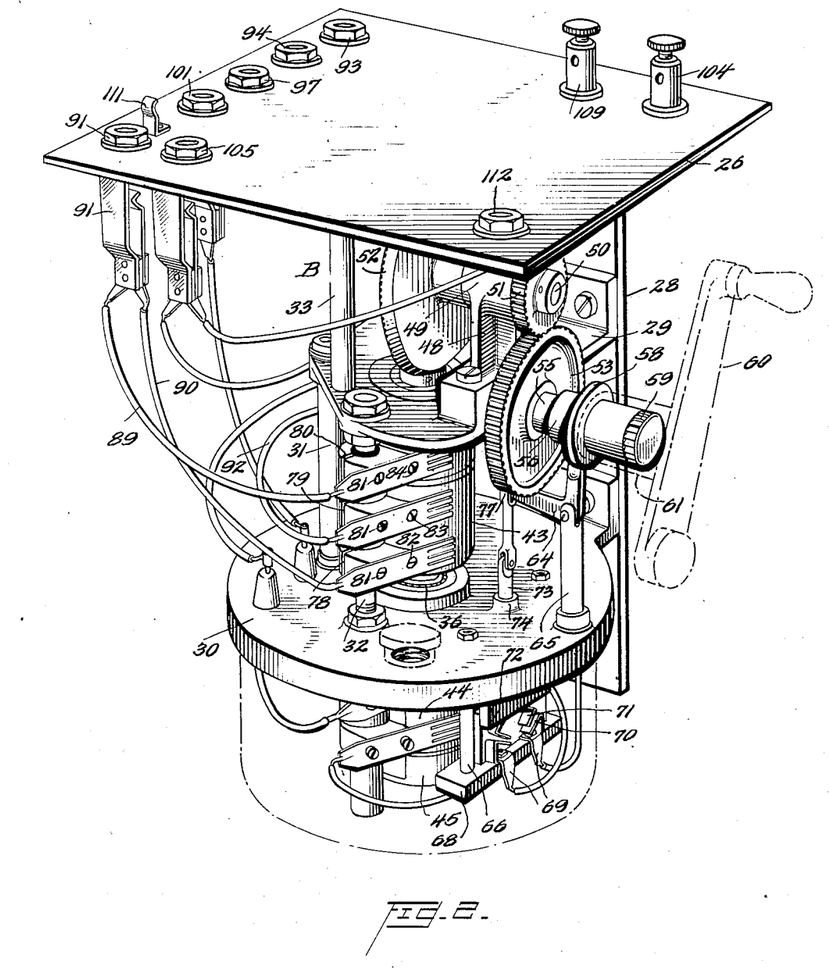
Figure 2 is a perspective view of the commutator.

The double commutator 13 is shown in perspective in Figure 2 of the drawings and comprises a supporting frame, a pair of commutator elements mounted upon a single spindle, a driving mechanism for said spindle and an automatic switch. Each of these parts will now be described in detail and their individual functions pointed out after which the recital of their conjoint use will be given.

The frame comprises a cover plate 26 having a depending flange 27 to which is attached a vertical plate 28 and which in turn supports a shelf 29. At a lower level the vertical plate supports a base 30. This base is also braced to the shelf by standards 31 and 32 and the shelf is braced to the cover plate 26 by the standard 33. The parts just described constitute a compact framework in which the double commutator is mounted.

Figures 3, 4, 5:
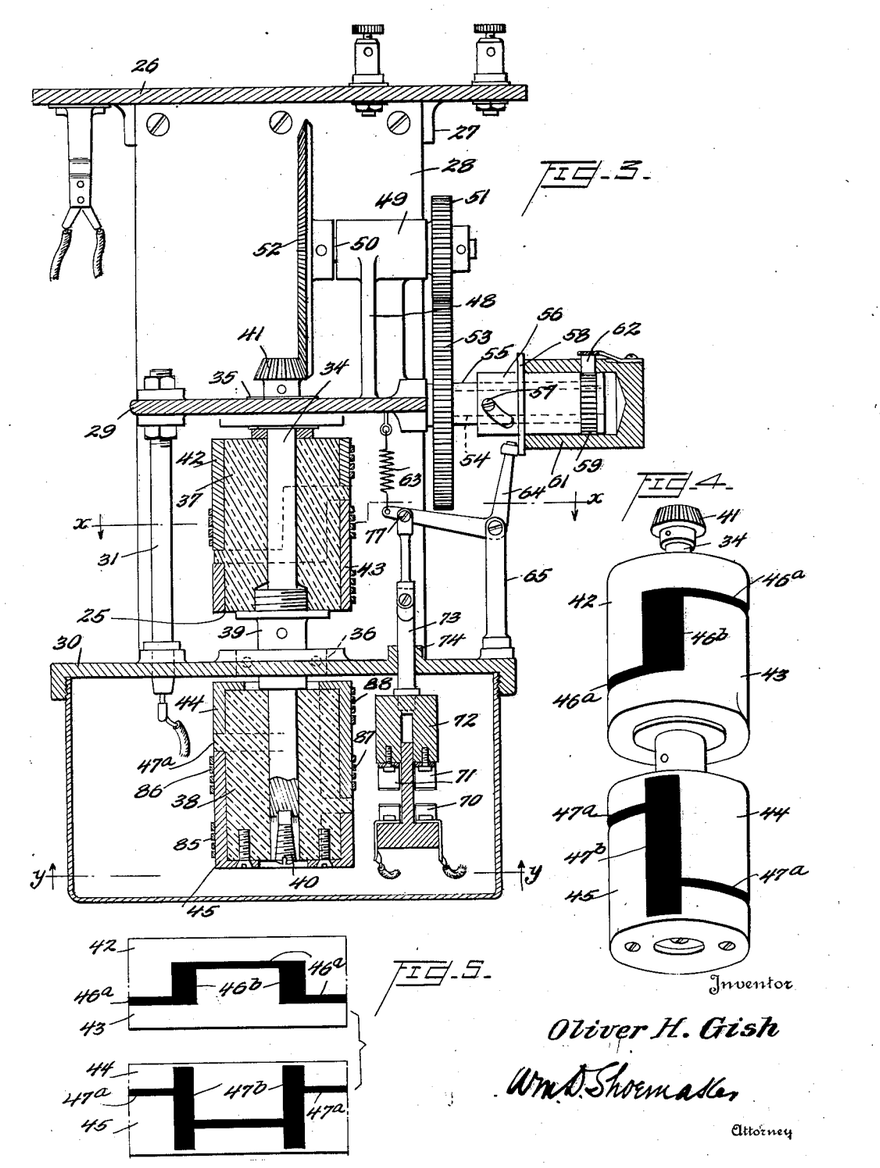
Figure 3 is a sectional view through the commutator.
Figure 4 is a detail of the commutator rotors.
Figure 5 is a view of the rotors surfaces spread out.

A spindle or shaft 34 is mounted in bearings 35 and 36 in the shelf and base, respectively. Between the shelf and base on the shaft is secured a commutator rotor 37 and below the base on an extended portion of the shaft is mounted a commutator rotor 38. A suitable collar 39 supports the rotor 37, while an expansion screw 40 frictions the lower end of the shaft in the rotor 38. The beveled pinion 41 supports through its hub the shaft in the upper bearing.

Both rotors 37 and 38 are of insulating material and are faced with metal cylinders 42, 43, 44 and 45. The cylinders 42 and 43 are separated on the rotor 37 by means of insulating material, and likewise those numbered 44 and 45 on the rotor 38. It will be noted from a perusal of Figure 4 wherein the commutator shaft and rotors are shown in perspective, and from Figure 5 where the metal cylinders are shown cut and spread out, that the insulating material consists of horizontal sections 46a and vertical sections 46b on the upper rotor, and of the horizontal sections 47a and vertical sections 47b on the lower rotor, whereby between the two horizontal sections of the insulating material, the metal cylinders are overlapped and beyond the horizontal portions they are not. In the case of the rotor 38, however, beyond the horizontal portions the cylinder is broken. This construction is for a purpose which will hereinafter appear in detail.

A post 48 is mounted upon the shelf 29 and at the upper end of this post there is a bearing 49 for a shaft 50, on one end of which is mounted a small gear 51 and on the other end a large bevel gear 52. This large gear 52 meshes with the beveled pinion 41, and the small gear 51 is mounted in driving relation with the larger gear of the same type 53. This gear 53 is supported on a shaft 54 extending from the shelf 29 and the gear has a hub 55 on which is mounted a sleeve 56. There is a pin and slanted slot connection between the hub and sleeve designated by the numeral 57, so that upon a rotation of the sleeve in a clock-wise direction the hub and gear will be rotated after the sleeve has moved through an arc represented by the slot of the pin and slot connection. In this rotation, however, a collar 58 has been brought forward for a purpose hereinafter to be explained.

The sleeve terminates at its outer end in a ratchet toothed section 59. To rotate the sleeve a crank 60 is employed and this crank has on it a socket portion 61 which fits over the sleeve 56 and abuts the collar 58. In this position a spring detent 62 on the crank engages the ratchet section of the sleeve 56. It will be appreciated that a turn of the crank clock-wise will now cause the sleeve 56 to be likewise turned and the gear 53 will then drive the shaft 34 through the gear 51 and the beveled gears 52 and 41, and it will also be observed that during this driving the sleeve 56 has advanced toward the sleeve 29 and that upon a cessation of movement the sleeve 56 is free to return to its normal position shown in Figure 3 without regard to the position of the crank.

The returning of the sleeve 56 to normal position is accomplished by the spring 63 acting upon the bell crank 64, one end of which travels upon the collar 58. This bell crank is mounted on the post 65 supported from the base 30.

Figures 6, 7, 8:
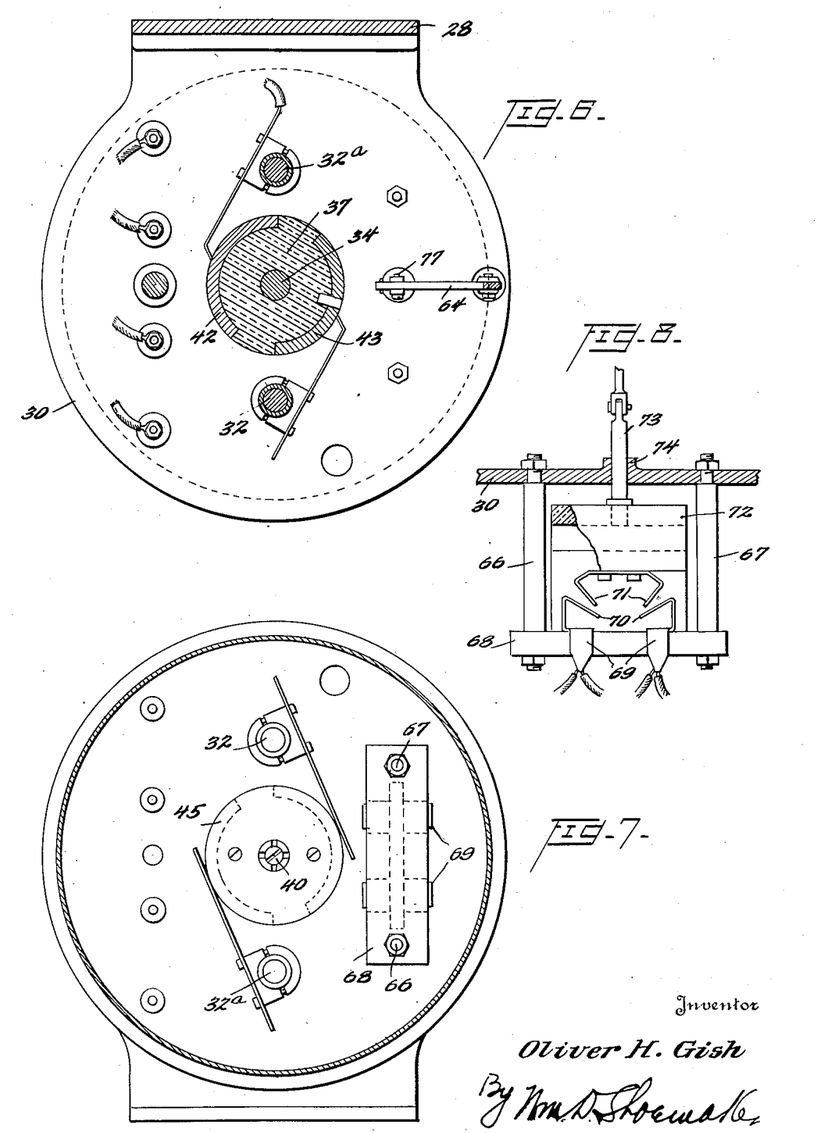
Figure 6 is a sectional view taken on the line $x$—$x$ of Figure 3.
Figure 7 is a similar view taken on the line $y$—$y$ of Figure 3.
Figure 8 is a detail of the contacting mechanism of the automatic safety switch.

Referring to Figure 8, there is a pair of long bolts 66 and 67 which support a block of insulating material 68 from the base 30. On the block 68 are mounted four metal members 69 terminating in springs 70 of a switch mechanism. These terminals 70 are brought into electrical communication with corresponding elements 71 carried by the sliding insulating block 72. The block 72 is carried by a sliding bolt 73 which is mounted in a bearing 74 in the base 30 and is pivotally connected at 77 to one arm of the bell crank 64.

The block 68, as shown in Figure 3, has an upwardly extending partition formed as an integral part thereof, which partition fits into a slot in the block 72. The purpose of this is to prevent short circuits due to the arcing when the switch is opened.

It will now be apparent that the switch which has just been described in detail will be closed at the same time that the sleeve 56 is moved inwardly in the act of cranking or starting the commutator and it will be fully apparent that as soon as the cranking ceases the spring 63 operating through the bell crank 64 will open the switch at the same time throwing the sleeve 56 outwardly. As will be hereinafter explained it will be desirable to have current flowing only at the time the commutator is being rotated and the mechanism which has been hereinbefore described in detail accomplishes this result.

On the standard 32 is mounted a series of clamping blocks insulated by a sleeve on the standard and designated by the numerals 78, 79, and 80, these clamps being made in two parts and secured to the standard by means of the screws 81. Brushes 82, 83, and 84 are held to the block by these same screws. A companion brush 83a similarly formed is mounted on a standard 32a on the diametrically opposite side of the rotor 37.

The standards 32 and 32a are extended below the base 30 and on the extended portions thereof are mounted, in a manner similar to those just described, four brushes, 85, 86, 87, and 88, two of which are upon the standard 32 and the others upon the standard 32a. Referring to Figures 3 and 4 it will be observed that the brushes 82, 83, 84 and 83a are employed in connection with the rotor 37 wherein the vertical portion 46b of the insulation is wider than the vertical portion 47b of the insulation on the rotor 38.

Referring again to the tips of the brushes, which are best shown in Figures 6 and 7, it will be observed that the upper set of brushes are so bent that the tips only are in contact with the rotor, whereas the brushes on the lower set are permitted to bear flat-wise upon the rotor. This feature, in connection with the difference in width of the insulated gaps on the rotors facilitates adjustments which insure that the circuit controlled by the rotor 37 is never closed when that controlled by the rotor 38 is open, and which furthermore insure that the circuit controlled by rotor 37 is closed during those periods of operation when the current is steady in the circuit controlled by rotor 38, whereby there are avoided erroneous results which would otherwise arise from any unbalanced electrical transients induced in the circuit controlled by the rotor 37 during the making or breaking of the circuit controlled by the rotor 38.

Figure 9:
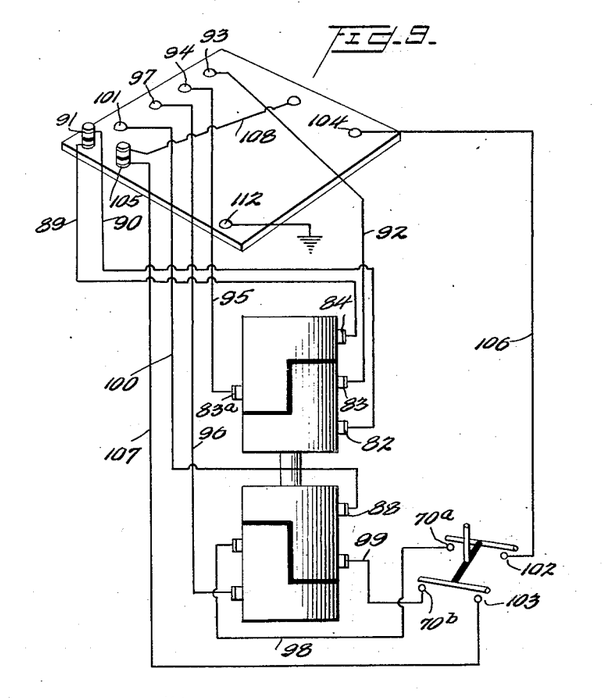
Figure 9 is a wiring diagram of the commutator.

The commutator just described is connected with the ground and with the other elements of the apparatus through suitable wiring which will now be recited, and elucidated by a wiring diagram which has been inserted as Figure 9. Leads 89 and 90 run from brushes 84 and 82 respectively to a double jack 91. Brush 83 is connected by the lead 92 to a single jack 93, while the companion brush 83a is connected to an adjacent jack 94 by the lead 95.

Brush 85 is connected by the lead 96 to a single jack 97, while brush 86 is connected by the lead 98 to a switch terminal 70a. Brush 87 is likewise connected to a switch terminal 70b through lead 99, while brush 88, is connected through the lead 100 to a single jack 101.

A four-point switch has two of its terminals, 102 and 103, connected respectively to the battery post 94 and the double jack 105 through leads 106 and 107. A lead 108 extends from the double jack 105 to a second battery post 109.

The wiring of the commutator itself having been set forth, it will now be in order to show how this commutator is connected electrically to the field circuits and to the other elements of the apparatus. Jack 93 receives the end of the field circuit lead to electrode 16; jack 94 that to the electrode 17; jack 97 that to the electrode 10; and jack 101 that to electrode 11. In many uses of the apparatus a direct connection between jacks 93 and 94 to the electrodes 16 and 17 is sufficient, but under certain conditions in order to eliminate large steady potentials between the electrodes 16 and 17, it is desirable to insert a condenser, indicated in Figure 1 by the numeral 110, in one of the field lines connecting the commutator with the electrodes 16 and 17.

It will be appreciated that provision, such as is well known to electrical engineers, may be made for the connecting in of such a condenser at the point where the field line connects with the commutator.

Battery posts 104 and 109 are connected to any suitable battery 14. Double jack 105 connects directly with both terminals of the milliammeter 15. Double jack 91 is connected with the two terminals of the potentiometer 19 through a hand-operated reversing switch.

For the purpose of shielding the potentiometer and its circuits from the battery circuit, the potentiometer is so surrounded with a metal case that all the possible leakage paths are thereby intercepted. This metal case connects in turn with the face plate 26 of the commutator by means of a protected cable and the outer part of which is a flexible metal sheath, for example, a tubular copper braid, and which establishes connection with both the potentiometer case and the face plate 26. This connection is established by means of a spring 111 which is employed on the potentiometer case as well as on the face plate 26. This spring contacts with the metal sleeve of a plug which sleeve in turn makes contact with the flexible metal cable sheath. With this repeated at both ends of the protected cable the connection between the face plate of the commutator and the metal potentiometer case is completed. In order to intercept all leakage paths from the commutator itself, the base 30 in contact with the shaft 34 is electrically connected with the face-plate 26 which is then connected to a neutral point in earth, as for example, at 24, by means of a line from the jack 112.

The foregoing detail description of the parts of the apparatus and of the individual functions of these parts should be sufficient for a complete understanding of the elements individually.

It remains therefore to give a recital in detail of the purpose of the invention and the mode of proceeding with the taking of a single measurement or reading, and the method of studying the earth's crust by means of a multiplicity of such measurements and readings and finally a discussion of the conjoint use of the several elements of the apparatus in the accomplishment of these purposes.

The purpose of the invention is to explore the earth's crust by means of electrical measurements or readings made at the earth's surface as hereinbefore indicated and thereby ascertain the subsurface geological structure and its variations both laterally and with depth and thus assist in the location of minerals of many and varied sorts, in the location, designing, etc., of mines or deep foundation structures, bridge piers and other operations where a knowledge of the hidden geological structure is needed. The depths of earth which have been explored in this manner vary from a few feet to as great as 2000 feet. The method, however, promises to be successful in exploring to even greater depths.

The measurements in a region of homogeneous earth taken by this method, when applied in a suitable formula or equation, yield the resistivity, or resistance of the unit cube, of earth. As is well known, the resistivity of different geological formations differs over wide limits, and thereby is found a possibility of distinguishing different types of earth structures.

The methods consist in passing a measured current through the earth between two selected points and measuring the potential differences between two other selected points resulting from the flow of the current.

For convenience and simplicity these points are usually placed at equal intervals on a straight line, and it is this particular situation which will be considered in the following paragraphs. The two extreme points serve as the current terminals and the two intermediate points serving as those between which the potential difference is measured.

A current from the battery 14 is measured by the milliammeter 15. This when commutated by the commutator section 12 passes through the earth between electrodes 10 and 11 in alternately opposite directions. The flow of this current through the earth gives rise to a difference in potential between electrodes 16 and 17 which also alternates in direction in the same manner as the current first described. By means of the commutator section 18, this potential is rectified so that it may be measured by means of a direct current potentiometer 19. The current measured by the milliammeter 15 and the potential measured by the potentiometer 19 together with the length of the interval between adjacent electrodes for example the distance between electrodes 16 and 17, will then give the complete data necessary for a determination of the resistivity by the formula:

$$\rho = 2\pi a V / I$$

in which "rho" is the resistivity in ohms per centimeter cube, "$a$", the distance between electrodes 16 and 17 in centimeters, "V", the measured potential in volts, and "I", the measured current in amperes.

When the distance "$a$" is small, the resistivity thus determined applies to a relatively small volume of earth in the region of the electrodes and near the surface. If the distance "$a$" is increased, the depth of the portion of earth for which such determination of resistivity applies is correspondingly greater, and in general this depth is approximately equal to the distance "$a$" itself.

A single reading, however, is of only very limited value in studies of the structure of the earth's crust. As will appear from the foregoing discussion, it will at once be evident that by obtaining a series of measurements with successively increasing values of the distance "a", greater and greater depths of earth may be explored and by the character of change noted in this series of restivities thus secured, the depth at which some change in geological sub-structure occurs as well as the character of the structure giving rise to the change, may be estimated, if the relation of the distance "a" between electrodes 16 and 17 and the effective depth of the portion of earth affecting the corresponding measurement is known. This relation has been found to be a very simple one, namely the depth of earth affecting a given measurement is approximately equal to the distance "a", for cases where the strata of earth are horizontal and homogeneous.

Referring to Figure 1, at the bottom portion thereof, the dotted lines extending between electrodes 10 and 11 represent diagrammatically the general course which the electric current follows in flowing through the earth, and the concentration of these lines gives an indication of the density of current. The other curves which intersect these at right angles are lines along which the potential is everywhere equal, but between successive lines the potential varies by equal steps. Thus it will be seen that the difference of potential between the electrodes 16 and 17 is relatively small compared with the difference over equal intervals near electrodes 10 and 11. When a given current is flowing the distance between these last mentioned lines will depend upon the specific resistance offered by the particular earth to the flow of electricity.

Furthermore, if more current is, by suitable means, forced through the earth, the lines of equal potential will be crowded closer together, other factors remaining unchanged.

This drawing is for the ideal case of a homogeneous earth extending to an indefinite depth. In case the earth departs from this ideal as is the situation to be dealt with in most of the measurements for which this method is used, the lines of current flow and the lines of equal potential are altered from those shown here, not alone in distance between successive lines, but also as regards their shape. Thus for example, in the simple case where a horizontal stratum of earth is of a higher electrical resistance, the lines of current flow above it will be crowded together, and in it they will be separated; and the reverse will take place if the sub-stratum is of lower electrical resistance. As was indicated hereinbefore, the increase in current in the upper stratum of earth will result in the lines of equal potential being brought closer together.

When the distance "a" is such that the measurement is affected only by the upper stratum of earth, and when this measurement is compared with a like measurement obtained with the distance "a" such as to include the effect of the sub-stratum, the presence of a difference in the two strata will be at once detected. By following this procedure in more minute steps the exact position at which this sub-stratum affects the measurements can be determined and therefore its depth below the surface. With an adequate number of measurements, distributed laterally, the horizontal extent of the sub-stratum may be determined.

In taking a reading, the handle 60 is rotated which in turn causes the four point switch to establish contact. A current from the battery 14 then passes through the milliammeter 15 and by means of the lower commutator section the current is caused to flow in alternate directions through the earth between the points 10 and 11. The battery and the milliammeter are, however, always in the same relation to each other so that the current through the milliammeter is never reversed and therefore the pointer will always be deflected in the same direction. However, it will be appreciated that the current in the milliammeter will be interrupted at the time the brushes 85, 86, 87 and 88 of the lower section of the commutator are traveling across the gaps on the commutator rotor. These gaps are all of the same width. This interruption, however, is so short in comparison with the natural period of the milliammeter pointer that no appreciable vibration is caused in the pointer. The actual current flowing through the earth while the circuit is complete is slightly greater than that indicated on the milliammeter, since it gives an average for the whole time. A correction to the current reading is necessary on this account when making precise measurements of resistivity.

When the current is flowing through the earth it establishes a difference in potential between the electrodes 16 and 17; and this difference in potential varies in direction in the same sense that the current between electrodes 10 and 11 varies in direction. The difference in potential is conveyed to the brushes 83 and 83a of the upper commutator section which commutator section is designed to rectify this alternating difference of potential so that it may be measured by the direct current potentiometer 19.

Here again, as the brushes 83 and 83a cross the insulating gaps in the upper rotor of the commutator, the circuit is interrupted for a brief interval, which, however, is short also and affects the galvanometer only slightly during the time the potentiometer is being adjusted; however, after adjustment is completed no current flows through the galvanometer and therefore it is indifferent to this circuit being opened or closed, and consequently no correction for this reading is required.

Figure 10:
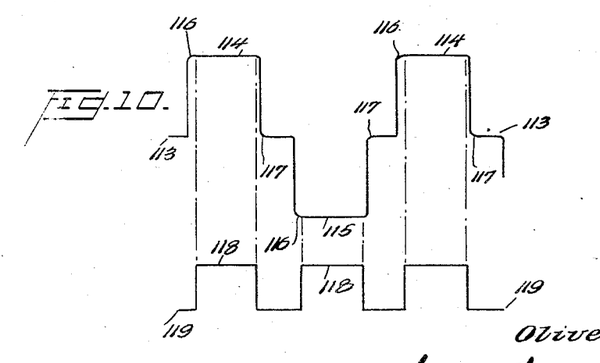
Figure 10 is an illustrative oscillogram of the current in the several parts of the circuits.

Referring now to Figure 10 which is a schematic representation of the alternating current which is sent through the earth; the horizontal line 113—113 represents the absence of current flow, 114 the current flow in one direction, while 115 is the current flow in the opposite direction. The distance of lines 114 and 115 from 113—113 is the representation of the strength of current. The portions designated by the numeral 116 represents the character of change occurring while the current is being established in the respective directions, whereas the portion 117 represents the character of change occurring while the current is being interrupted. These changes which are referred to as electrical transients induce corresponding transients in the circuits which are employed for measuring potential differences. The character of these transients varies in an irregular manner and are a source of serious error consequently, at least in the more difficult measurements. To avoid these and other sources of error, the design characteristics of the commutator shown in Figures 4 and 5 are employed. These are such that measurements of potential are obtained only at times when inductive or transient effects are not occurring. This is accomplished by making the insulating gap 46b of the upper rotor wider than the insulating gap 47b of the lower rotor, so that when the brushes are properly adjusted, as is readily possible with this arrangement, the potential measurement is being taken only over the interval represented by the straight lines 114 and 115 (see Figure 10); the rectified current passing through the galvanometer of the potentiometer is represented by the lower portion of Figure 10 in which the line 119—119 represents the absence of current and the line 118 represents the flow of current. The length of the line 118 is never greater than the straight portion of either line 114 or that of line 115.

I claim:

1. An apparatus for studying the earth's crust consisting of a source of current, an instrument for measuring the value thereof, a potentiometer, a double rotor commutator, leads from each rotor of said commutator to the earth, leads from one of said rotors to the current measuring instrument and the source of current, and leads from the other rotor of said commutator to the potentiometer.

2. The combination of claim 1 in which a condenser is placed in one of said earth leads.

3. The combination of claim 1 in which means is provided for preventing current leakage from the current supply circuit to the potentiometer circuit.

4. The combination of claim 1 in which the commutator is provided with means for transforming the current passed through the earth into alternating impulses, with means for maintaining the current passing through the potentiometer as unidirectional, and with means for eliminating the transient effects in said last mentioned current due to changes which occur in the earth current when it is being established or interrupted.

5. An apparatus for studying the earth's crust comprising a double rotor commutator, a source of electricity supplying current to one side of one rotor of said commutator, a pair of leads from the opposite side of said commutator through either of which current may flow to an electrode in the earth's crust and thence through a portion of the earth's crust and return through the other of said leads connected to a correlated electrode in the earth's crust, the commutator being so formed that in its rotation the current from said source of electricity will be caused to flow first in one and then in the other direction through the part of the circuit comprised of said earth leads and said portion of earth, a pair of leads from one side of the second rotor of the commutator extending to spaced electrodes in the earth's crust located in a position correlative to the first-mentioned electrodes, and leads extending from the opposite side of said second rotor to a potentiometer, said second rotor of said commutator being so formed that alternating potential-drops received through its earth-leads will be transmitted as a unidirectional potential-drop to said potentiometer.

6. The combination of claim 5 wherein the potentiometer and the leads and other connecting parts therefrom to the associated commutator and the associated commutator section itself together with other built-in parts of this electrical circuit are all protected from leakage of electrical currents from circuits outside thereof by a casing and other suitably interconnected parts which are connected by a lead to a relatively neutral point in the earth's crust.

7. In a commutator for use in the study of the earth's crust, the combination of a pair of rotors adapted to make and break related circuits during rotation of the rotors, a switch controlling the said related circuits, and means for operating said rotors and said switch, said means comprising a shaft, a sleeve mounted on said shaft and having a slip in connection therewith, and a handle for operating said sleeve.

In testimony whereof I affix my signature.

OLIVER H. GISH.